United States Patent

[11] 3,599,744

| [72] | Inventors | Rigsby C. Satterfield<br>Jenkintown;<br>Thomas J. Ballantyne, Chalfont, both of, Pa. |
|---|---|---|
| [21] | Appl. No. | 821,205 |
| [22] | Filed | May 2, 1969 |
| [45] | Patented | Aug. 17, 1971 |
| [73] | Assignee | Eaton Yale & Towne Inc.<br>Cleveland, Ohio |

[54] VEHICLE SAFETY DEVICE
9 Claims, 6 Drawing Figs.

[52] U.S. Cl. ................................................ 180/96,
293/71, 200/61.44, 293/4
[51] Int. Cl. .................................................... B60k 27/08,
B60l 3/04

[50] Field of Search ............................................. 180/96,
91—95; 200/61.44, 61.43; 293/4, 71, 52 F

[56] References Cited
UNITED STATES PATENTS

| 1,925,763 | 9/1933 | Kirschen | 180/96 |
| 2,012,539 | 8/1935 | Maas | 180/96 |
| 2,730,396 | 1/1956 | Johnson | 293/71 |
| 2,920,713 | 1/1960 | Paradise | 180/94 |
| 3,308,903 | 3/1967 | Sobel et al. | 180/96 |

*Primary Examiner*—Kenneth H. Betts
*Attorney*—Teagno & Toddy

ABSTRACT: A safety device for a vehicle includes an energy-absorbing portion for preventing human injury in a collision and means responsive to an impact on the safety device for controlling operation of the vehicle.

PATENTED AUG 17 1971
3,599,744
SHEET 1 OF 3
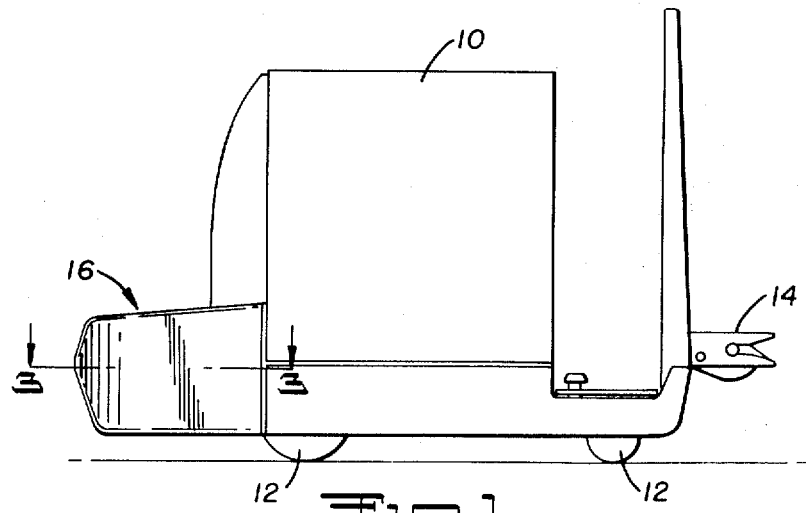
Fig 1
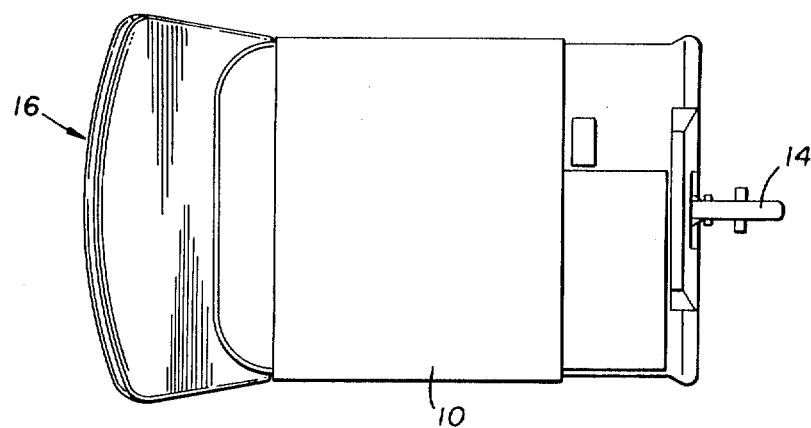
Fig 2
Fig 3
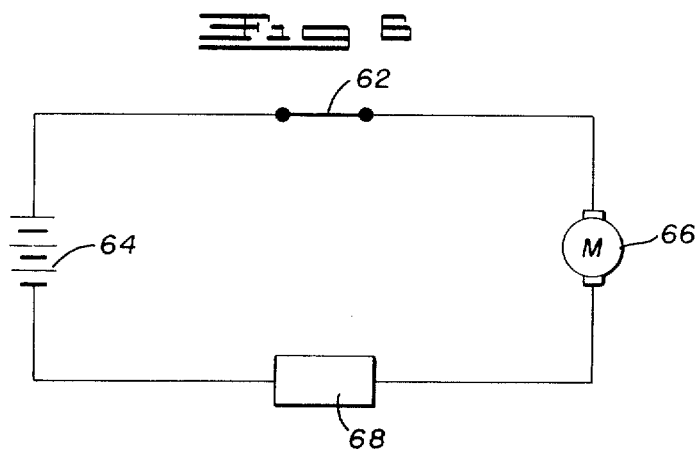
INVENTORS
THOMAS J. BALLANTYNE
RIGSBY C. SATTERFIELD
BY
*Teagno & Toddy*
ATTORNEY

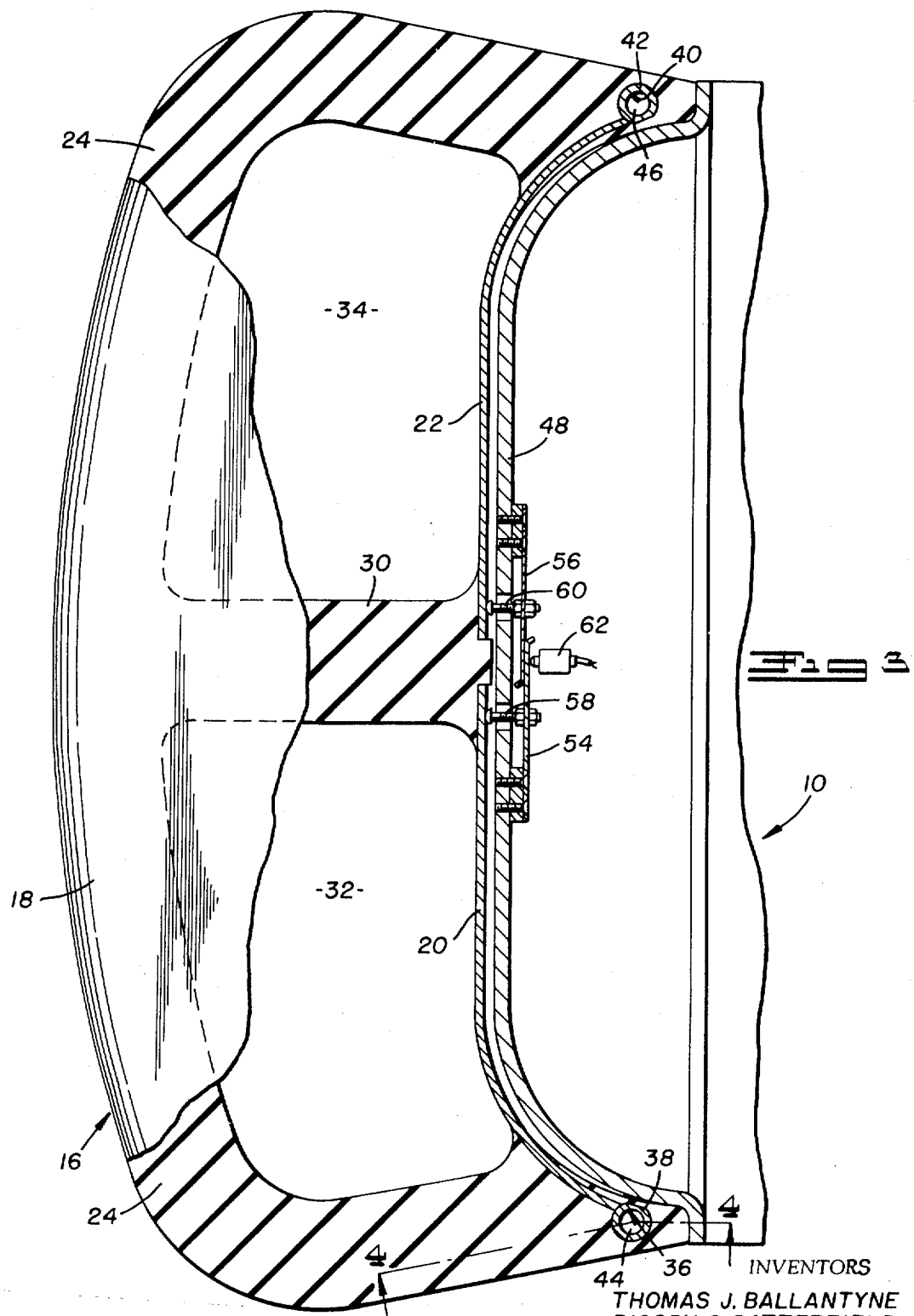

VEHICLE SAFETY DEVICE

BACKGROUND OF THE INVENTION

1. Field of Invention

This invention relates to a safety device for vehicles generally and more particularly to a novel impact absorbing vehicle control device for preventing damage to objects and injury to humans.

2. Description of the Prior Art

Many devices have been designed for the purpose of preventing damage to vehicles and injury to persons during vehicle collisions. Depending on the location of these devices on the vehicle, various descriptive names have been applied thereto.

The most common term for externally mounted devices is, of course, bumpers. For the most part, bumpers have been designed to be sacrificial while performing the energy-absorbing damage preventing function and must therefore be replaced after a vehicle collision because of damage thereto. Others are not sacrificial, referring for example to the energy absorbing foam structures normally mounted on the dash panels internally of the vehicle.

Bumpers which, upon impact, serve to control further operation of the vehicle are likewise known in the art. It is to this particular type of safety device that the invention of the present application is directed.

SUMMARY OF INVENTION

It is a primary object of the present invention to provide a simple, reliable, energy absorbing, nondestructible safety device for preventing damage to objects and injuries to persons during a vehicle collision and for decelerating the vehicle upon initiation of a collision.

The body of the safety device comprises a relatively soft energy absorbing body portion of substantial thickness which will permit collision of a relatively high inertia vehicle with a person or object without undue injury or damage thereto. Imbedded within the body portion is a frame portion having substantially greater strength and resistance to deformation then the body portion. The body and frame portion of the safety device are mounted on the vehicle by means of a hinged connection so that the frame portion is free to pivot upon impact of the vehicle with a person or an object. In dissipating the energy of the collision, the energy-absorbing portion of the safety device permits the vehicle to decelerate over a distance thereby decreasing the rate of energy absorbing necessary to prevent human injury or damage to an object. The hinged connection of the frame portion of the safety device to the vehicle permits the safety device to be deflected about the hinge point and that deflection is used to control deceleration of the vehicle such as by application of the vehicle brakes or otherwise. The hinge connection of the bumper to the vehicle provides the function of activating the vehicle control regardless of the angle of impact during a collision.

Having thus briefly summarized my invention, reference will now be made to the attached drawing wherein a preferred embodiment of the present invention is shown.

BRIEF DESCRIPTION OF THE DRAWING

FIG. 1 is a side elevational view of a vehicle having a safety device of the present invention attached thereto.

FIG. 2 is a plan view of the vehicle of FIG. 1 and illustrating further the safety device of the present application.

FIG. 5 is an enlarged portion of FIG. 3 illustrating in greater detail a part of the invention of the present application.

FIG. 6 is an electrical diagram illustrating a preferred means of vehicle control possible with the invention of the present application.

DESCRIPTION OF A PREFERRED EMBODIMENT

Reference will now be made to the attached drawing, FIGS. 1—6 for a complete description of the structure, function and operation of a preferred embodiment and where in FIGS. 1 and 2 there is disclosed a vehicle 10 of the type generally referred to as a towing tractor.

The vehicle 10 is provided with a plurality of traction and steering wheels 12 and a hitch 14 to which trailers or carts may be attached for hauling thereby. The vehicle 10 is also provided with a safety device 16 to which the present application is particularly directed.

Figure 3:
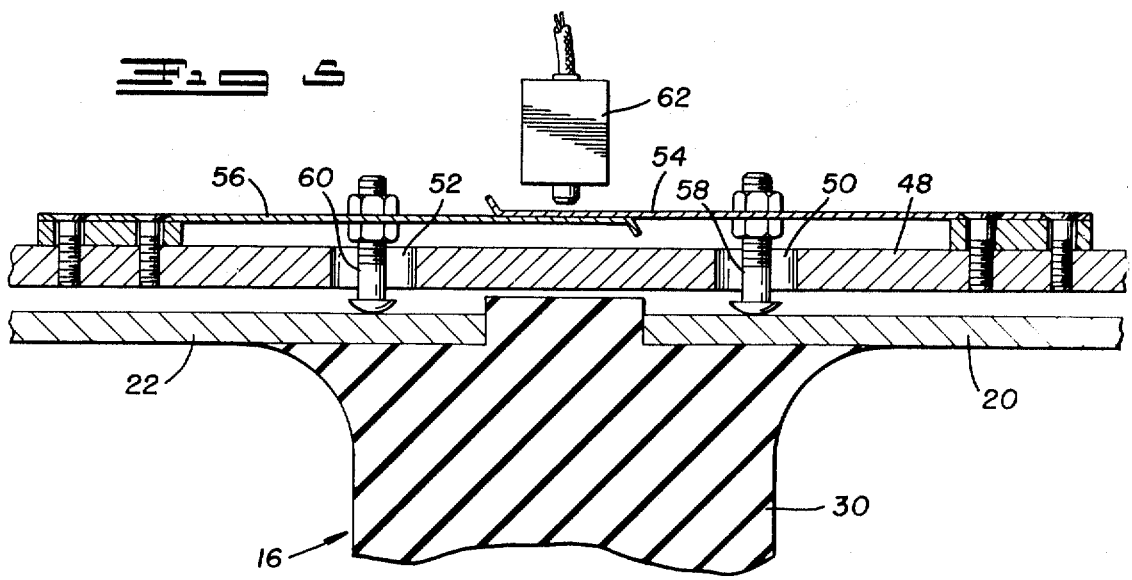
FIG. 3 is a partial sectional view of the safety device of the present application taken along line 3-3 of FIG. 1.

In FIG. 3, the safety device 16 is shown in greater detail as comprising a body portion 18 and frame portions 20 and 22. The frame portions 20 and 22 are, in the embodiment shown, molded into the body portion 18 and are adhesively secured thereto by the natural adhesion of the body portion material. Other means of attachment of the frame portions 20 and 22 to the body portion 18 are, of course, possible.

The body portion 18 comprises a generally peripheral web section 24, generally horizontal upper and lower web sections 26 and 28 and a vertical web section 30 extending from the peripheral web section 24 to the frame portions 20 and 22. The web sections 24, 26, 28 and 30 define the exterior configuration of the safety device 16 and provide the requisite structural support therefor. In addition, the web sections 24, 26, 28 and 30 and the frame portions 20 and 22 define chambers 32 and 34 interiorally of the safety device 16, the function of which will be described in detail hereinafter. The body portion 18 is constructed of an elastically deformable material, such as expanded rubber or synthetic foam, having sufficient structural strength to support the safety device 16 while being readily deformable upon impact of an object or person therewith so as to prevent damage or injury to the object or person impacted. It is also desirable that the body portion material be energy absorbing during deformation. Materials possessing sufficient strength which are elastically deformable and energy absorbing during deformation are known in the art and are presently used in the automotive industry as dash panels and the like.

Referring now to the frame portions 20 and 22, it can be seen that the frame portion 20 defines an eye 36 near one end 38 thereof. The other frame portion 22 defines a similar eye 40 near one end 42 thereof.

The eyes 36 and 40 of the frame portions 20 and 22 are adapted to receive vehicle mounted pins 44 and 46. The pin 44 is mounted to a front plate 48 of the vehicle 10 through a bracket 51 or other intermediate support mechanism. Pin 46 is connected to the front plate 48 of the vehicle 10 in a similar manner. When mounted on the vehicle 10, as described above and as illustrated in FIGS. 1 and 2, the frame portions 20 and 22 are pivotal with respect to the plate 48.

Due to the hinged or pivotal connection of the frame portions 20 and 22 to the vehicle 10, it can be seen that if the vehicle 10 when moving in a forward direction were to collide with a person or an object, the force of the collision will tend to pivot one of the frame portions 20 or 22 about one of the pins 44 or 46, depending on the location of the collision on the safety device 16 such that the one of the frame portions 20 or 22 will be pivoted from its normal position of FIG. 3 toward the front plate 48 of the vehicle 10. In other words, the force from any vehicle collision, while the vehicle is moving in a forward direction will generate a moment in one of the frame portions 20 or 22 about one of the pins 44 or 46 in a direction tending to move the frame portion toward the vehicle front plate 48.

In FIG. 3 and as better illustrated in FIG. 5, the vehicle plate 48 has a pair of openings 50 and 52 therethrough. Mounted on the vehicle plate 48 and secured thereto by suitable fastening means are a pair of arms 54 and 56. Secured to the arm 54 and extending through the opening 50 into contact with the frame portion 20 of the safety device 16 is a rod 58. Secured to the arm 56 and extending through the opening 52 into contact with the frame portion 22 of the safety device 16 a is a second rod 60.

It can be seen that the arms 54 and 56 are in overlapping sliding relationship to each other.

It can be further seen that the above described pivotal movement of the frame portions 20 or 22 will result in movement of either one or both of the arms 54 or 56.

Mounted on the vehicle 10 and located in the path of movement of the arms 54 and 56 is a normally closed electrical switch 62.

In FIG. 6, it can be seen that the switch 62 is electrically in series with a source 64 of electrical power, a vehicle drive motor 66 and vehicle controls generally indicated at 68.

Figure 4:
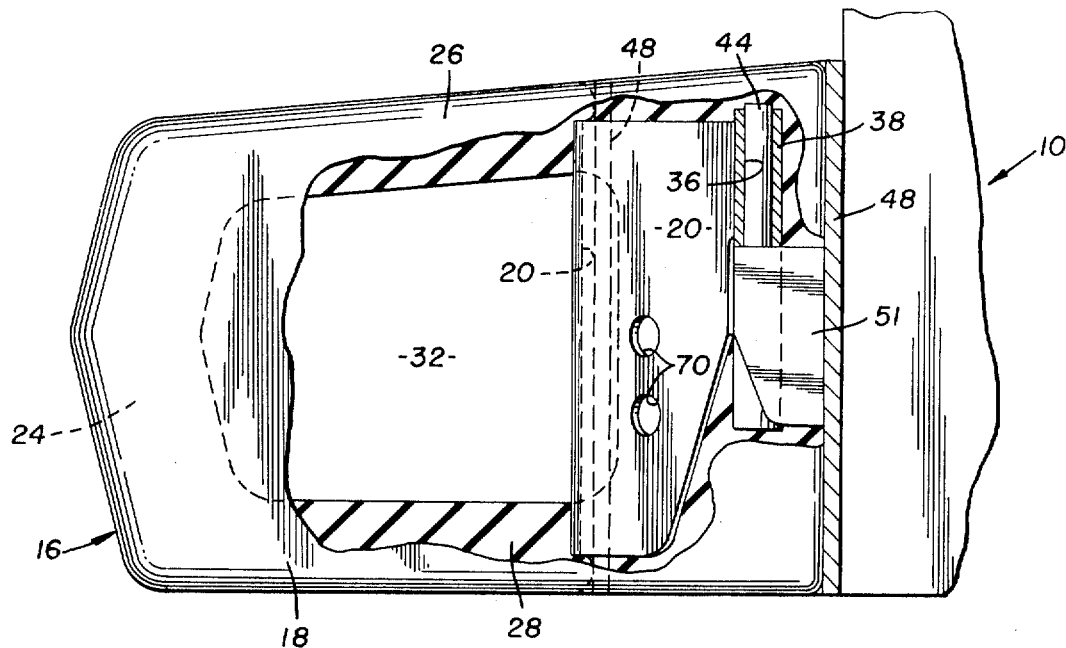
FIG. 4 is a side elevational view of FIG. 3 wherein a portion of the safety device is broken away along the line 4-4 to illustrate the safety device in further detail.

Referring now to FIGS. 3 and 4, it can be seen that if the vehicle 10, while travelling in a forward direction collides with an obstruction, the safety device 16 will operate as follows: the peripheral web 24 and upper and lower webs 26 and 28 will be deformed to absorb the energy of the collision and one or both of the frame portions 20 and 22 will be pivoted about the pins 44 or 46 thereby causing the switch 62 to be opened and the vehicle drive motor deenergized so as to cause the vehicle 10 to decelerated. It may also be desirable that one of the vehicle controls 68 be an electrically operated vehicle brake control constructed in such a manner that opening of the switch 62 will result in an application of the vehicle brakes so as to bring the vehicle to a more rapid stop after a collision. The safety device 16 extends forward of the vehicle 10 a reasonable distance in order to allow for the deceleration of the vehicle 10 after impact with an obstruction.

As mentioned above, it is possible to utilize the chambers 32 and 34 defined by the web sections 24, 26, 28 and 30 and the frame portions 20 and 22 to advantage. The chambers 32 and 34 may be filled with a highly energy absortive material or as shown in FIG. 4 the chambers 32 and 34 may contain atmospheric air and the frame portions 20 and 22 provided with orifices 70 to restrict the escape of air at increased pressure during a collision. The increased pressure resulting, of course, from deformation the safety device 16. This restricted flow of air from the chambers 32 and 34 results in an efficient dissipation of the energy of the collision with a resultant reduction in the risk of damage or injury from the collision.

Having thus described my invention, I now claim:

1. A safety device for vehicles comprising:
a frame member mounted on said vehicle adjacent an outer edge thereof for pivotal movement about a generally vertical axis;
a deformable body portion enclosing said frame member and extending across substantially the entire width of said vehicle, said body portion thereby being adapted to generate a moment acting on the frame member tending to pivot the frame member about said vertical axis upon the existence of a force on any part of the body portion due to a vehicle collision; and
means responsive to pivotal movement of the frame member to initiate deceleration of said vehicle.

2. A safety device as defined in claim 1 further comprising:
means operatively associated with the body portion for dissipating a portion of the energy generated as a result of a vehicle collision.

3. A safety device for vehicles comprising:
two frame members mounted on said vehicle and each frame member including a pivotal attachment to said vehicle at an opposite outer edge thereof for pivotal movement about generally vertical axes;
a deformable body portion coextensive with and operatively interconnecting the frame members for generating a moment in one of the frame portions tending to pivot the frame portion about one of the vertical axes upon the existence of a force anywhere in the body position due to a vehicle collision; and
means responsive to pivotal movement of the frame portion to initiate deceleration of said vehicle.

4. The safety device of claim 3 wherein:
the deformable body portion and the frame portions cooperate to define a chamber of substantial volume for absorbing energy during the occurrence of said collision.

5. The safety device of claim 3 wherein the means responsive to pivotal movement of the frame portion comprises:
actuating means mounted on said vehicle and responsive to pivotal movement of the frame portion;
switch means operatively associated with the actuating means for actuation thereby;
a vehicle control circuit, in which the switch is included, for controlling operation of said vehicle upon actuation of the switch.

6. The safety device of claim 5 wherein the vehicle control circuit comprises:
means for initiating deceleration of said vehicle upon actuation of the switch.

7. The safety device of claim 3 wherein said deformable body portion is hollow and extends a substantial distance forwardly of said frame portions, and further includes a web member within said hollow deformable body portion adapted to transmit a force anywhere on the exterior surface of said deformable body portion to said frame members at a position spaced from said pivot axes whereby the moment tending to pivot said frame members is generated.

8. A safety device for vehicles comprising:
a frame member mounted on said vehicle for pivotal movement about a generally vertical axis;
a deformable body portion operably associated with the frame member adapted to generate a moment acting on the frame portion tending to pivot the frame member about said vertical axis upon the existence of a force in the body portion due to a vehicle collision;
means responsive to pivotal movement of the frame member to initiate deceleration of said vehicle; and
means operatively associated with the body portion for dissipating a portion of the energy generated as a result of a vehicle collision, wherein said body portion cooperates with the frame member for defining a fluid chamber therein and includes an orifice communicating with said chamber and the atmosphere, said orifice being of such a size as to restrict fluid flow from said chamber upon deformation of the body portion during a collision.

9. A safety device for vehicles comprising:
two frame members mounted on said vehicle and each frame portion including a pivotal attachment to said vehicle for pivotal movement about generally vertical axes;
a deformable body portion coextensive with and operatively interconnecting the frame members for generating a moment in one of the frame portions tending to pivot the frame portion about one of the vertical axes upon the existence of a force in the body portion due to a vehicle collision;
said deformable body portion comprising an elongate member of relatively soft energy-absorbing material having a front wall portion, a top wall portion, a bottom wall portion and an intermediate vertical wall portion interconnecting the front wall portion, the top wall portion and the bottom wall portion, each of the wall portions being connected to the frame members and the intermediate wall portion further interconnecting the frame members; and
means responsive to pivotal movement of the frame portion to initiate deceleration of said vehicle.